United States Patent

Ishibashi

[11] Patent Number: 5,937,824
[45] Date of Patent: Aug. 17, 1999

[54] FUEL INJECTION AMOUNT CONTROL SYSTEM FOR DIESEL ENGINE

[75] Inventor: Yasutaka Ishibashi, Ageo, Japan

[73] Assignee: Nissan Diesel Motor Co., Ltd., Saitama-ken, Japan

[21] Appl. No.: 09/076,508

[22] Filed: May 12, 1998

[30] Foreign Application Priority Data

May 15, 1997 [JP] Japan ................................. 9-125720

[51] Int. Cl.⁶ ..................................................... F02D 31/00
[52] U.S. Cl. ........................................... 123/370; 123/357
[58] Field of Search .................................. 123/370, 357, 123/373, 495, 372, 365

[56] References Cited

U.S. PATENT DOCUMENTS

| | | | |
|---|---|---|---|
| 2,910,057 | 10/1959 | Suttle | 123/370 |
| 4,583,506 | 4/1986 | Okamoto | 123/357 |
| 4,708,111 | 11/1987 | Shiozaki | 123/357 |
| 4,729,357 | 3/1988 | Freudenschuss | 123/357 |
| 4,873,959 | 10/1989 | Law | 123/357 |
| 4,917,065 | 4/1990 | Law | 123/370 |
| 5,148,789 | 9/1992 | Shiraishi | 123/370 |
| 5,806,487 | 9/1998 | Dolenc | 123/357 |

OTHER PUBLICATIONS

Nissan Diesel, Maintenance Guide, Electronic Control System for Engine in 1995 Model, Nissan Motor Company, Mar., 1995.

*Primary Examiner*—Carl S. Miller
*Attorney, Agent, or Firm*—Blackwell Sanders Peper Martin

[57] ABSTRACT

The present invention relates to a fuel injection amount control system for a diesel engine to control a fuel injection amount electrically by an electronic-hydraulic governor. In the invention, when a driver steps on the accelerator at 100% in acceleration to raise the engine speed suddenly and vigorously, a DC linear motor transfers a control rack to the full-rack position according to the engine speed to bring the necessary amount of fuel injection. The process is that the rack position detects the second rack position firstly and the control rack leaves the second rack position accordingly, then the DC linear motor suspends the control rack at the first rack position for a certain time under a signal, afterwards and the control rack is positioned to the full-rack position by another command given to the DC linear motor to operate again.

1 Claim, 4 Drawing Sheets

FUEL INJECTION AMOUNT CONTROL SYSTEM FOR DIESEL ENGINE

BACKGROUND OF THE INVENTION

1. Field of the Invention

The present invention relates to a fuel injection amount control system for a diesel engine to control a fuel injection amount electrically by an electronic-hydraulic governor.

2. Description of the Related Art

In recent years, a fuel injection amount control system for a diesel engine to control a fuel injection amount electrically by an electronic-hydraulic governor instead of a mechanical-hydraulic one has widely been used in vehicles.

Such a fuel injection amount control system collects into a control unit an engine driving condition and a driver's operating condition as information signals detected by an engine speed sensor and an acceleration sensor and controls the electronic-hydraulic governor based on the control signals from the control unit. As shown in FIG. 4, the electronic-hydraulic governor 1 comprises a DC linear motor 3 operated by the signals from the control unit, a control rack 5 engaging with the plunger in a fuel injection pump body which is not shown, a link 7 transmitting the activation of the DC linear motor 3 to the control rack 5, and a rack sensor 9 detecting the position of the control rack 5.

And, the fuel injection amount is adjusted by revolving the plunger in the fuel injection pump body by the control rack 5. The control unit calculating the necessary amount of fuel injection based on the information signals detected by the acceleration sensor and the engine speed sensor and the target rack position based on the fuel injection amount (the position of control rack 5 which is adequate in relation to the calculated amount of the fuel injection), changes the value of electrical current to the DC linear motor 3 in order that the target rack position coincides with the real rack position (the real position of the control rack 5 which is transferred by the DC linear motor 3), and controls the position of the control rack 5.

Usually in such a fuel injection amount control system, the fuel injection amount when fully accelerated is determined for each engine speed in advance, and the position of the control rack 5 for deciding the fuel injection amount is generally called the "full-rack position".

FIG. 5 is an example showing the full-rack position set up for each engine speed. The full-rack position at 1,000 rpm in engine speed, for example, indicates 12.00 mm. Then the control unit controls the DC linear motor 3 based on the value detected by the rack sensor 9 and transfers the control rack 5 from the standstill position(=0.00 mm) to 12.00 mm.

Thus, the prescribed fuel injection amount can be brought by revolution of the plunger according to the position of the control rack 5.

But, when a driver, driving at 1,000 rpm in engine speed and 40% in acceleration (point A in FIG. 5), suddenly and vigorously steps on the accelerator in order to pass another car ahead and the engine speed reaches 2,000 rpm, the DC linear motor 3 transfers the control rack 5 to the full-rack position (point B in FIG. 5) to bring the corresponding fuel injection amount. In that case, if the target position of rack L which is the difference from the point A to B is large, it has a disadvantage that the control rack 5 overshoots by inertia to bring the excess amount of the fuel injection, which causes black smoke by the worse effect of combustion.

SUMMARY OF THE INVENTION

In such a circumstance, the present invention aims to provide a fuel injection amount control system for a diesel engine for preventing the overshoot of the control rack and the generation of black smoke which have been caused when the engine speed is suddenly raised to 100% in acceleration.

The present invention relates to the fuel injection amount control system for a diesel engine to control the fuel injection amount of a fuel injection pump, by a control unit for controling an electronic-hydraulic governor based on the information signals from an acceleration sensor and an engine speed sensor, wherein the electronic-hydraulic governor comprises a DC linear motor operated by the signals from the control unit, a control rack engaging with the plunger in the fuel injection pump body, a link transmitting the activation of the DC linear motor to the control rack, and a rack sensor detecting the position of the control rack, and the control unit stores the full-rack position according to the engine speed, calculates firstly the necessary amount of the fuel injection based on the information signals detected by the acceleration sensor and the engine speed sensor and secondly the target rack position based on the fuel injection amount, and controls the position of the control rack by changing the value of electrical current to the DC linear motor in order to make the target rack position coincide with the real rack position, characterized in that when establishing the first rack position lower than the full-track position by a prescribed amount and the second rack position further lower than the first rack position by a prescribed amount according to the engine speed respectively and the target rack position at 100% in acceleration is larger than the difference between the full-rack position and the second rack position, the rack is positioned under the second rack position and then the control unit detects the second rack position and suspends the control rack at the first rack position for a prescribed time.

According to the present invention, the control unit, when driving, calculates the necessary amount of the fuel injection based on the information signals detected by the acceleration sensor and the engine speed sensor, calculates the target rack position based on the calculated amount of the fuel injection and then controls the control rack position by changing the value of electric current to the DC linear motor in order to make the real rack position coincide with the target rack position. As a result, the plunger in the fuel injection pump body revolves according to the position of control rack, which brings a prescribed amount of fuel injection.

And, when the driver steps on the accelerator at 100% in acceleration to pass ahead to raise the engine speed suddenly and vigorously, the DC linear motor transfers the control rack to the full-rack position according to the engine speed to bring the necessary amount of fuel injection. Its process is that the rack position detects the second rack position firstly and the control rack leaves the second rack position accordingly, then the DC linear motor which has received a signal suspends the control rack at the first rack position for a certain time and transfers the control rack to the full-rack position again by commanding the DC linear motor to operate.

As described above, the present invention enables preventing the control rack from overshooting by inertia power and black smoke from being generated by the worsening of combustion, even if the driver steps on the accelerator at 100% in acceleration (maximum accelerator position) to pass ahead and the engine speed is raised suddenly and vigorously.

BEST MODE FOR CARRYING OUT THE INVENTION

The present invention is described in detail in an example according to the drawings below.

Figure 1:
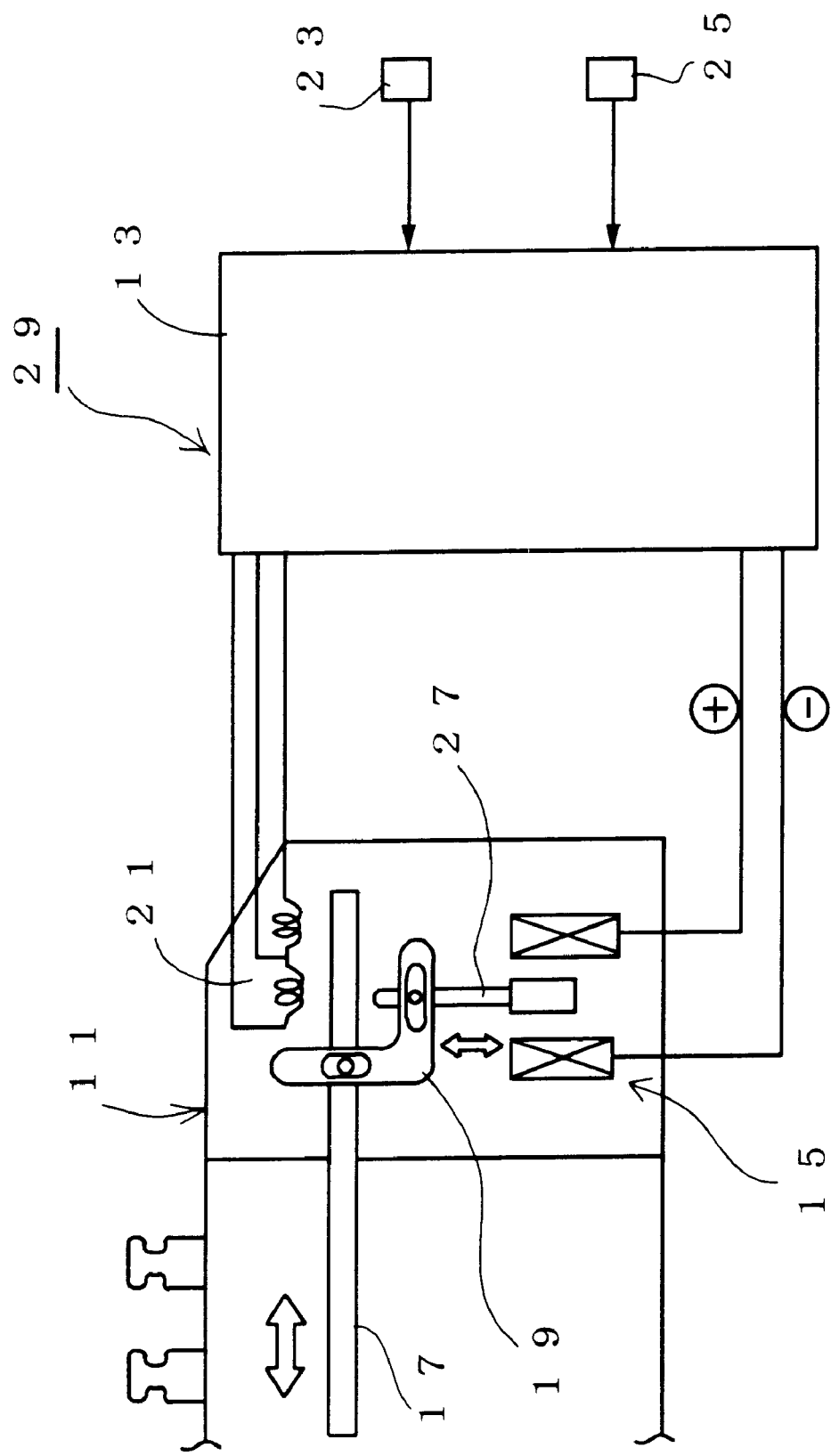
FIG. 1 is a schematic illustration showing a fuel injection amount control system according to an embodiment of in the invention.
Figure 4:
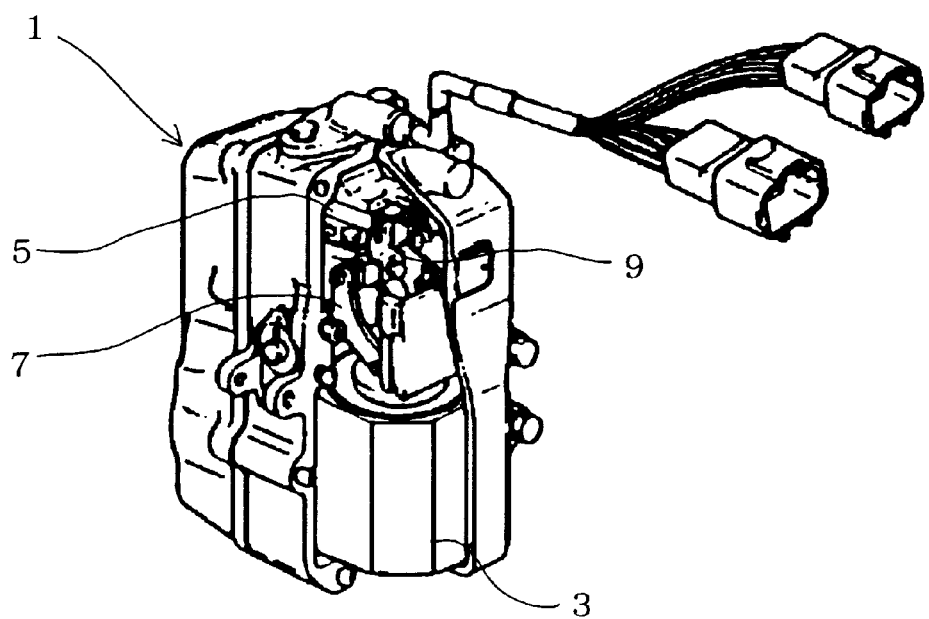
FIG. 4 is a perspective diagram of an electronic-hydraulic governor partially cutaway.

FIG. 1 shows an example of a fuel injection amount control system, and reference numeral 11 in the figure denotes an electronic-hydraulic governor. The electronic-hydraulic governor 11 comprises, as the prior example shown in FIG. 4, a DC linear motor 15 operated by the signals from a control unit 13, a link 19 transmitting the activation to a control rack 17 and a rack sensor 21 detecting the position of the control rack 17, the control rack 17 engaging with the plunger in the fuel injection pump body which is not shown in the figure.

And the control unit 13 calculates the necessary amount of fuel injection based on the information signals detected by an acceleration sonsor 23 for detecting the accelerating rate and an engine speed sensor 25 for detecting the engine speed (rpm), calculates a target rack position based on the calculated amount of fuel injection and then controls the position of the control rack 17 by changing the value of electric current to the DC linear motor 15 in order to make the target rack position coincide with the real rack position.

In the figure, 27 denotes a motor shaft of the DC linear motor 15. By the vertical motion of the motor shaft 27 in proportion to the value of electric current, the control rack 17 moves back and forth through a link along the arrow.

Figure 2:
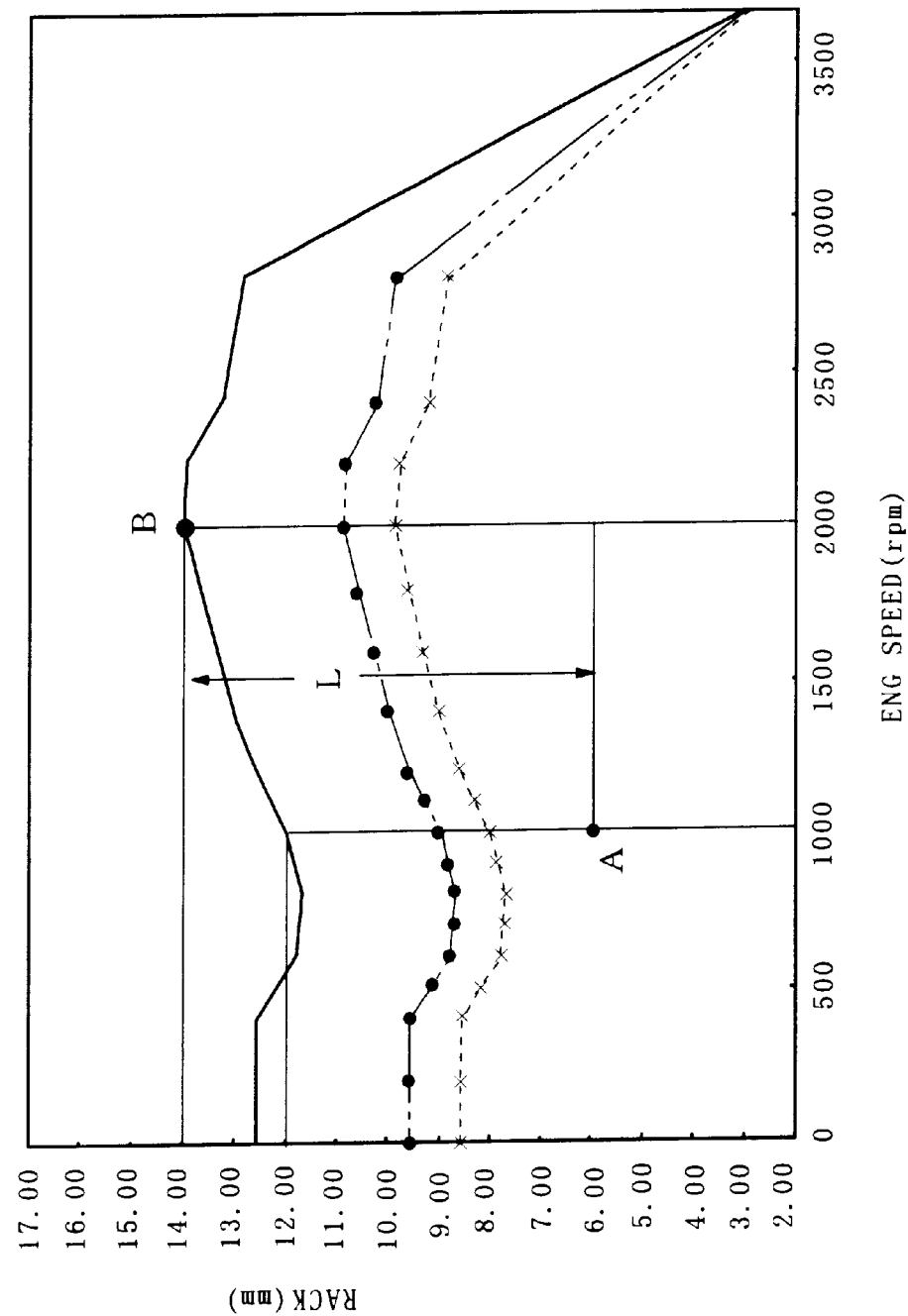
FIG. 2 is a graph showing the full-rack position, the first rack position and the second rack position.
Figure 3:
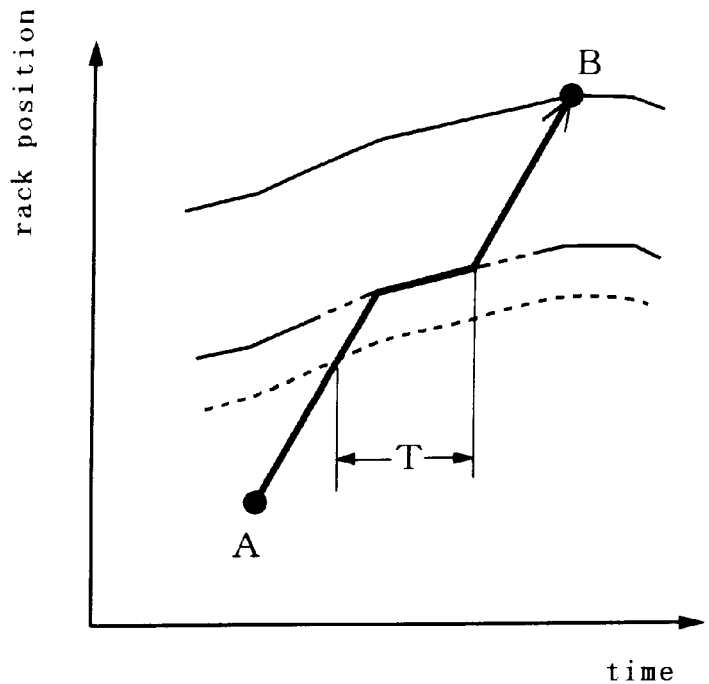
FIG. 3 is a graph showing the way of control of the control rack.
Figure 5:
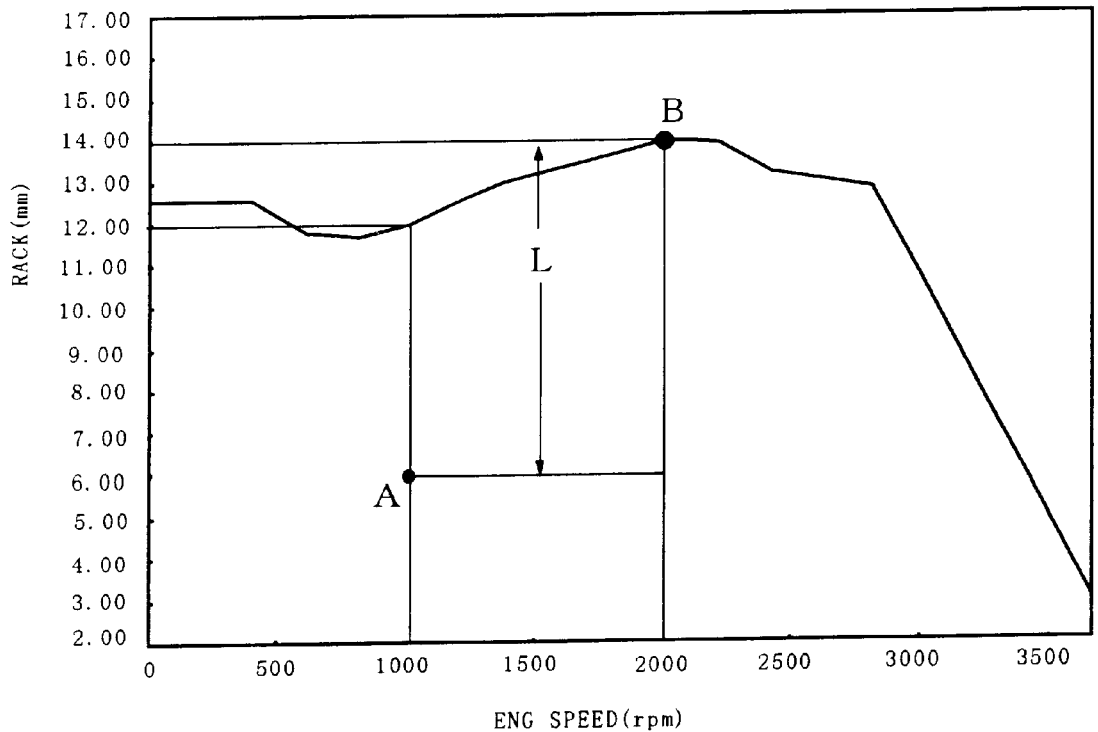
FIG. 5 is a graph showing the full-rack position.
Figure 6:
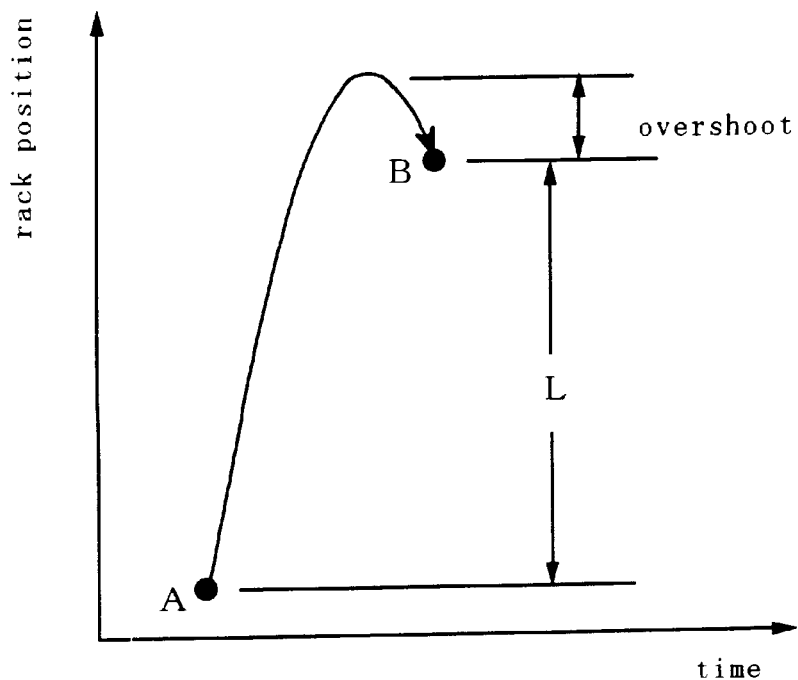
FIG. 6 is a graph showing the overshoot of control rack.

In addition, as shown by the solid line in FIG. 2, in the fuel injection amount control system 29 according to the example, the full-rack position which is same as that shown in FIG. 5 is input in the memory of the control unit 13.

The full-rack position at 1,000 rpm in engine speed, for example, indicates 12.00 mm and the control unit 13 controls the DC linear motor 15 based on the value detected by the rack sensor 21 and transfers the control rack 17 by 12.00 mm from the standstill position of the engine.

And as described with reference to FIG. 5, in the current fuel injection amount control system with the full-rack position established, when the driver, driving at 1,000 rpm in engine speed and 40% in acceleration (point A in FIG. 2), suddenly and vigorously steps on the accelerator in order to pass another car ahead and the engine speed reaches 2,000 rpm, the DC linear motor transfers the control rack to the full-rack position (point B in FIG. 5) to bring the corresponding amount of fuel injection. Then, if the target rack position L which is the difference from point A to B is large, there is a disadvantage that the control rack overshoots by inertia.

The present example, in order to prevent the overshoot of the control rack 17 in such a condition, shows the first rack position shown by the two-dot chain line in FIG. 2 which is 3 mm lower than the full-rack position and the second rack position shown by the broken line in FIG. 2 which is 4 mm lower than the full-rack position set up by the engine speed in the revolution range of 0 through 2,800 rpm.

And the control unit 13 operates such that, when the driver, driving at 1,000 rpm in engine speed and 40%) in acceleration (point A in FIG. 2), suddenly steps on the accelerator in order to pass another car ahead and the engine speed reaches 2,000 rpm as the above example, the rack sensor 21 detects the control rack 17 which is lower than the second rack position (L>4 mm) firstly, and the control rack 17 leaves the second rack position accordingly, then the DC linear motor 15 which received a command suspends it at the first rack position for a certain time (T=0.15 sec.), and afterwards transfers it to the point B again by another command.

The present example has such a function that when the driver, driving at 1,000 rpm in engine speed and 40% in acceleration (point A in FIG. 2), suddenly and vigorously steps on the accelerator in order to pass another car ahead and the engine speed reaches 2,000 rpm, the DC linear motor 15 transfers the control rack 17 to the full-rack position (point B in FIG. 2) to bring the necessary amount of the fuel injection. Then, the control rack 17 commands the DC linear motor 15 after leaving the second rack position to suspend at the first rack position for 0.15 sec. and by another command to the DC linear motor 15, the control rack 17 moves to the full-rack position (point B).

As described above, the present example has the function that when the driver steps on the accelerator at 100% in acceleration to raise the engine speed suddenly and vigorously, the control rack 17 does not move to the full-rack position, but suspends at the first rack position for a prescribed time, which prevents the control rack 17 from overshooting by internia which has usually happened. As a result, it enables to prevent the generation of black smoke due to the worsening of combustion which is caused by the excess amount of the fuel injection.

What is claimed is:

1. A fuel injection amount control system for a driver-controlled vehicle diesel engine to control a fuel injection amount of a fuel injection pump by a control unit for controlling an electronic-hydraulic governor based on the information signals from an acceleration sensor and an engine speed sensor, wherein;

said electronic-hydraulic governor comprises:
    a DC linear motor operated by the signals from said control unit,
    a control rack engaging with the plunger in the fuel injection pump body, the control rack being moveable in response to driver accelerator operation and to positions including a full-rack position,
    a link transmitting the activation of the DC linear motor to the control rack,
    a rack sensor detecting the position of the control rack; and
    wherein said control unit stores the full-rack position according to the engine speed, calculates firstly the necessary amount of fuel injection based on the information signals detected by the acceleration sensor and the engine speed sensor and secondly a target rack position based on said fuel injection amount, and controls and position of the control rack by changing the value of electrical current to the DC linear motor in order to make the target rack position and real rack position coincide,
    characterized in that the system operates so that when the control arm is advanced in acceleration in response to driver accelerator operation a first rack position is established lower than the full-rack position by a prescribed amount, and a second rack position is established further lower than said first rack position by a prescribed amount according to the engine speed respectively, and if the target rack position at 100% in acceleration is larger than the difference between the full-rack position and the second rack position, when the rack is initially positioned at less than the second rack position but moves to the second position, the control unit detects the second rack position and thereafter suspends the control rack at the first rack position for a prescribed time, whereby the control rack is prevented from overshooting by inertia.

* * * * *